United States Patent [19]

Vogel

[11] 3,940,672
[45] Feb. 24, 1976

[54] TAPE RECORDING AND PLAYBACK CONTROL CIRCUIT

[75] Inventor: John D. Vogel, Columbus, Ind.

[73] Assignee: Arvin Industries, Inc., Columbus, Ind.

[22] Filed: Aug. 14, 1974

[21] Appl. No.: 497,274

[52] U.S. Cl. .............. 318/467; 318/453; 318/617; 242/188; 360/74; 360/78
[51] Int. Cl.² ..................... G11B 75/48; G05D 3/06
[58] Field of Search .......... 318/452, 453, 467, 468, 318/474, 6, 7; 360/78, 74; 242/188

[56] References Cited
UNITED STATES PATENTS

| | | | |
|---|---|---|---|
| 3,583,617 | 6/1971 | Kosaka | 242/188 |
| 3,622,229 | 11/1971 | John | 360/74 |
| 3,676,609 | 7/1972 | Colye et al. | 360/78 |
| 3,691,313 | 9/1972 | Kobayashi et al. | 360/74 |
| 3,694,585 | 9/1972 | Goldner | 242/188 |
| 3,695,550 | 10/1972 | Lennox | 242/188 |
| 3,705,271 | 12/1972 | De Bell et al. | 360/74 |
| 3,746,278 | 7/1973 | Dennis et al. | 318/6 |
| 3,800,316 | 3/1974 | Kuharchuk | 360/74 |
| 3,838,454 | 9/1974 | Huber | 360/78 |

*Primary Examiner*—James R. Scott
*Assistant Examiner*—John J. Feldhaus
*Attorney, Agent, or Firm*—Jenkins, Hanley & Coffey

[57] ABSTRACT

An electronic control circuit for automatically stopping the tape drive motor of a magnetic tape recording and playing unit. A set of contacts is provided in the circuit to detect electrically conductive means located at preselected points along the magnetic tape, and upon such detection, to alter the conductive states of three control transistors to cause de-energization of the tape drive motor. Diode logic means in the circuit prevent automatic stopping of the drive motor when the recording and playing unit is operated in a particular mode wherein such stopping is not desired.

17 Claims, 1 Drawing Figure

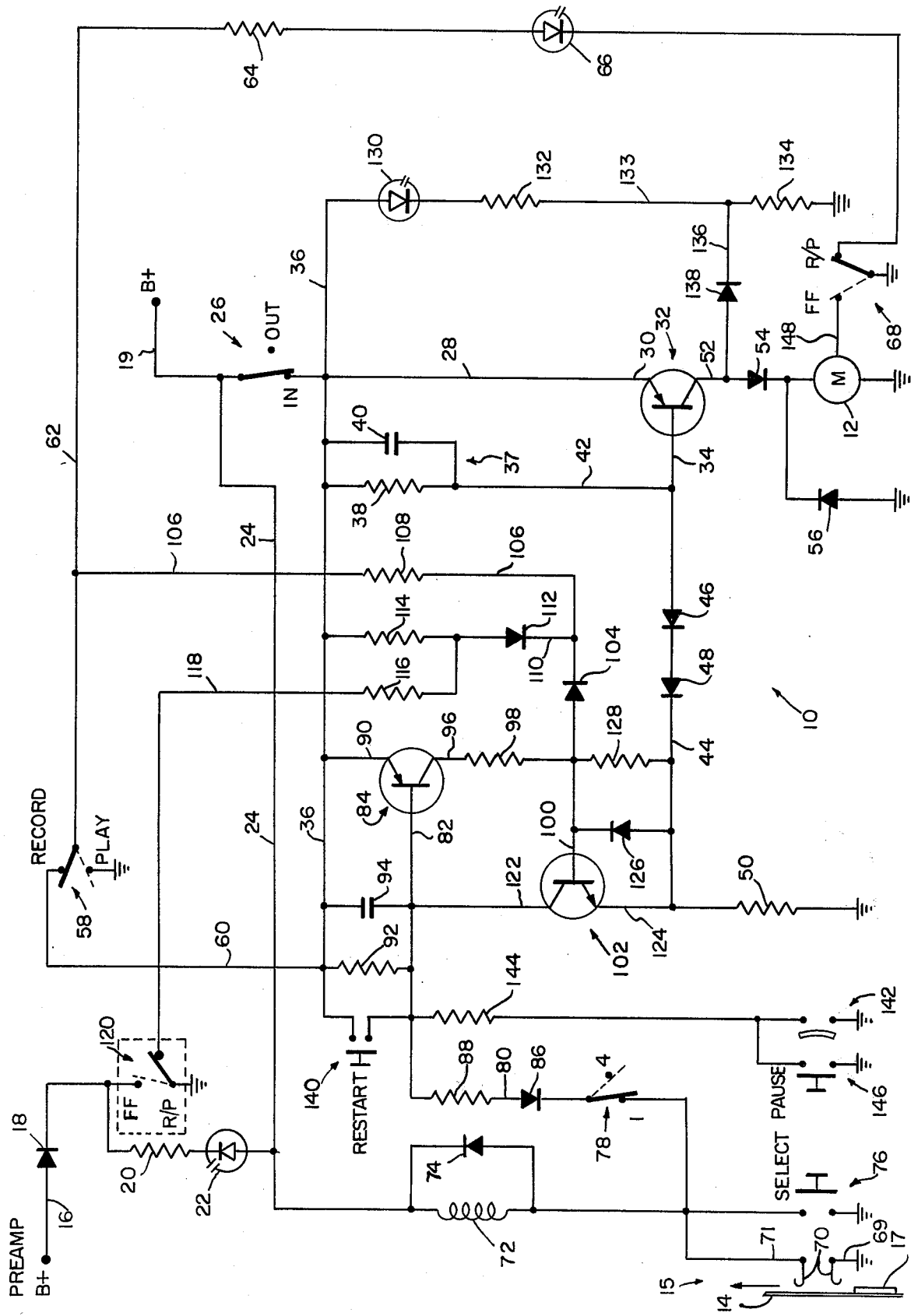

TAPE RECORDING AND PLAYBACK CONTROL CIRCUIT

BACKGROUND OF THE INVENTION

This invention relates to an electronic control circuit for automatically controlling the operation of a magnetic tape recording and playing unit. More specifically, this invention relates to an electronic control circuit for automatically stopping the unit tape drive motor at preselected points along the tape and in accordance with the mode in which the unit is operating.

Multi-track tape recording and playing units are commonly operable in a plurality of different modes of operation. These modes are, for example, the record mode, the record fast forward mode, the play mode, and the play fast forward mode. In at least some of these modes, it is often desirable to provide control means for automatically stopping the magnetic tape drive mechanism to stop conveyance of the tape at selected points along the tape, such as for example at the end of a particular program track. Such automatic stopping is particularly desirable when the recording and playing unit is operated in the record mode, or in one of the fast forward modes. Alternatively, it is desirable to inhibit the control means to prevent stopping of the tape drive when the unit is operated in the play mode to allow the unit to continuously switch to and play successive program tracks on the tape.

Typically, the control means for automatically stopping the tape drive mechanism of multi-track recording and playing units comprises an electromechanical relay system having various normally-open and normally-closed contacts. Such contacts are usually interconnected to the unit record/play head, and are appropriately closed and opened to effect the desired stopping of the drive mechanism. However, such electromechanical relay systems are complicated by the numerous possible modes of operation of modern tape recording and playing units, since automatic stopping of the tape drive is neither necessary nor desirable in some modes of operation. Moreover, electromechanical relay systems are inherently unreliable for long periods of use since the contacts can wear out or become pitted, and thereby require replacement. Furthermore, the conventional relays are relatively bulky and expensive, and are generally incompatible with the miniaturization requirements of modern multi-track units.

The present invention overcomes these inherent disadvantages by providing an electronic control circuit for automatically stopping the tape drive mechanism of a recording and playing unit in accordance with the mode of unit operation. Moreover, this invention provides a control circuit which is compatible with modern solid state techniques, which is relatively inexpensive, and which is inherently long-lived.

SUMMARY OF THE INVENTION

In accordance with the invention, an electronic control circuit is provided for selectively controlling the energization of the tape drive mechanism of a magnetic tape recording and playing unit. The circuit is responsive upon detection of electrically conductive means on the magnetic tape to de-energize the tape drive in selected modes of unit operation to automatically stop conveyance of the tape. Logic means in the circuit prevent de-energization of the tape drive when the unit is operated in a mode wherein tape stoppage is not desired.

By way of example, in the preferred embodiment, the states of a plurality of switches in the circuit determine the particular operation mode of the recording and playing unit. Such modes are, for example, record, record fast forward, play, and play fast forward. A set of contacts in the control circuit is located in the unit record/play head to detect when the conductive means on the tape passes said head. The set of contacts combines with the switches to establish the conductive states of three control transistors and a diode logic circuit. The transistors and the logic circuit are electrically coupled to the tape drive motor to de-energize said motor upon closure of the set of contacts by the conductive means on the tape when the unit is operating in the record mode or in one of the fast forward modes. In the play mode, the logic circuit prevents de-energization of said motor to allow continuous unit operation.

BRIEF DESCRIPTION OF THE DRAWING

The accompanying drawing is a circuit diagram illustrating an electronic control circuit of this invention.

DETAILED DESCRIPTION OF THE PREFERRED EMBODIMENT

An electronic control circuit 10 of this invention is shown in the drawing and controls the operation and energization of a tape drive motor 12 of a combination tape recording and playing unit. The motor 12 is typically a D.C. motor and provides rotational power for driving magnetic tape 14 past a record/play head 15 of the unit. The circuit 10 is responsive to detect small aluminum or other electrically conductive strips 17 located at preselected points along the tape 14, and to de-energize the drive motor 12 upon detection of one of the strips 17 to stop conveyance of the tape in accordance with the mode in which the recording and playing unit is operating. Such modes are, for example, the record mode, the record fast forward mode, the play mode, and the play fast forward mode.

The magnetic tape 14 can be of the cartridge, reel-to-reel, or other conventional variety, and can contain single or multiple program tracks. For purposes of the description, however, it will be assumed throughout that the magnetic tape 14 is carried in a conventional tape cartridge and contains eight program tracks, with two of said tracks being utilized at any given time to provide the so-called stereo effect. In such a multi-track cartridge tape, the electrically conductive strips 17 are normally provided at the conclusion of the program tracks. In this position, they provide indication to the record/play head 15, as will be hereafter described, that the track has run out and that the unit must be either stopped or switched to a new track, depending upon the mode of unit operation. Conveniently, since two of the tape tracks are utilized simultaneously, it is only necessary that tracks 1–4 contain the conductive strips 17.

As shown in the drawing, a positive voltage, hereafter designated as B+ voltage, is supplied from the recording and playing unit to the control circuit 10 through a supply line 19 to one side of a cartridge switch 26. The switch 26 is mechanically closed whenever a tape cartridge is inserted into the recording and playing unit.

When the cartridge switch 26 is closed, the B+ voltage is supplied from the switch through a conductor 28 to the emitter electrode 30 of a PNP junction transistor 32. The cartridge switch 26 is also coupled to the base electrode 34 of the transistor 32 via a conductor 36, a filter 37 having a resistor 38 and a capacitor 40 connected in parallel, and a line 42. A conductor 44 is provided to interconnect the base 34 of the transistor 32 to ground potential through a pair of serially connected, forward-biased diodes 46 and 48, and a resistor 50. Thus, when a tape cartridge is inserted into the unit to close the switch 26, the transistor 32 receives B+ voltage at its emitter 30 and current flow to ground through its base 34. This switches the transistor 32 to its "ON" state and provides substantially B+ voltage from its collector electrode 52 through a forward-biased diode 54 to the motor 12. The motor is energized and begins to convey the magnetic tape 14 past the record/play head 15. Conveniently, the rotational speed of the motor is controlled by a conventional governor (not shown), and spike suppression is provided by a reverse-biased diode 56 connected in parallel with the motor and grounded.

With the motor 12 operating, the recording and playing unit is placed in a record mode by moving a manually operable record/play switch 58 to its full line position as shown in the drawing. This switch is simultaneously operative to place the conventional recording and playback electronics (not shown) of the unit in a record mode to record information on the magnetic tape. In the record position, a path is provided from the B+ voltage supply through the conductor 36 and a line 60 to the record/play switch 58, and further through a line 62 having a serially connected resistor 64 and a record light 66 to ground via a switch 68. This provides a voltage potential across the record light 66 to turn the light on and give indication that the unit is recording.

When one of the conductive strips 17 on the tape 14 reaches the record/play head 15 of the unit while the unit is operating in the record mode, the strip 17 passes across and electrically closes a normally open set of contacts 70. One side 69 of the contacts 70 is connected to ground, and the other side 71 is coupled in parallel to a solenoid 72 and to a manual switch 78. The solenoid 72 is connected via a supply lead 24 directly to the B+ supply lead 19, and cooperates in a conventional manner with a track change mechanism (not shown) in the record/play head. Whenever the contacts 70 are bridged, the solenoid energizes to operate the track change mechanism which mechanically raises or lowers the record/play head to bring the head into operative engagement with the next successive pair of program tracks on the tape 14. Conveniently, a reverse-biased diode 74 is connected across the solenoid 72 to eliminate transient responses across the solenoid. Also, the solenoid is conveniently coupled to a track selector switch 76 which is connected in parallel with the head contacts 70. The selector switch 76 is normally open, and can be momentarily closed at any time to energize the solenoid and change program tracks on the tape.

The manual switch 78 connected to the side 71 of the head contacts 70 is movable between an open position and a closed position, and dictates whether the control circuit 10 will function to de-energize the tape drive motor 12 at the conclusion of each set of tracks on the tape or only at the conclusion of the final tracks. In the closed position indicated by the number 1 in the drawing, the control circuit is effective to automatically de-energize the motor at the conclusion of each set of tape tracks.

The head contacts 70 are connected through the manual switch 78, when said switch is closed, via a line 80 to the base electrode 82 of a second PNP junction transistor 84. As shown, the line 80 is interrupted by a diode 86 which isolates the transistor 84 from large positive voltages, and a resistor 88 which limits the current at the base of the transistor 84. The B+ voltage supply is connected through the cartridge switch 26 and the conductor 36 to the emitter electrode 90 of the transistor 84, and through a parallel resistor 92 and capacitor 94 to the base electrode 82 of the transistor 84. Thus, when the head contacts 70 are closed at the end of a set of tape tracks by a conductive strip 17, ground potential is presented through the contacts 70 and the closed switch 78 to the base 82 of the second transistor 84. This is effective to switch the transistor 84 to its "ON" state and thereby provide substantially B+ voltage at the collector electrode 96 of the transistor 84.

The collector electrode 96 of the second transistor 84 is coupled through a collector resistor 98 to the base electrode 100 of an NPN junction transistor 102, and to the anode of a diode 104. The cathode of the diode 104 is connected via a line 106 and a resistor 108 to the B+ voltage potential through the record/play switch 58. Therefore, when the unit is in a record mode, a positive voltage is presented through the switch 58 and the line 106 to the cathode of the diode 104. The cathode of the diode 104 is also connected by a line 110 to the cathode of another diode 112. The anode of the diode 112 is connected in parallel through a resistor 114 to the conductor 36, and through another resistor 116 and a line 118 to ground at a switch 120. Importantly, the resistance value of the collector resistor 98 and of the resistors 108 and 114 are chosen so that the voltages presented at the cathodes of the diodes 112 and 104 when the unit is in the record mode is greater than the voltages presented at their respective anodes. Thus, the diodes 112 and 104 are reverse-biased in the record mode. In practice, in one experimental model of the control circuit, the resistance values in ohms of the resistors 98, 108, and 114 were respectively 680, 2200, and 120.

The NPN transistor 102 has its collector electrode 122 connected directly to the ground line 80 of the base 82 of the second transistor 84. Thus, when the unit is in the record mode with the diode 104 reverse-biased and the second transistor 84 conducting, the transistor 102 also switches "ON" to provide a substantially B+ potential at the emitter electrode 124 of the transistor 102.

The emitter 124 of the transistor 102 is connected through the serially connected diodes 48 and 46 to the base electrode 34 of the motor transistor 32, and also through the resistor 50 to ground. When the transistor 102 is "ON," the substantially B+ potential at its emitter eliminates the path to ground for the base electrode 34 of the motor transistor 32. This permits B+ voltage potential to be presented at the base 34 of the motor transistor via the line 42 to switch the transistor 32 to its "OFF" condition, and thereby reduce the voltage at the collector 52 of the transistor 32 to zero. This automatically de-energizes the motor 12 to stop conveyance of the magnetic tape 14 past the unit record/play head 15. Conveniently, the NPN transistor 102 is protected against possible back-biasing by a diode 126 and a resistor 128 connected in parallel between the base of the transistor 102 and the conductor 44.

The control circuit 10 is provided with a "STOP" light 130 which is turned on whenever the motor 12 has been automatically de-energized by the control circuit. As shown, the light 130 is connected on one side to the B+ voltage supply via the conductor 36 whenever the cartridge switch 26 is closed. The other side of the light 130 is connected via a line 133 through a pair of serial resistors 132 and 134 to ground. A lead 136 having a diode 138 interconnects the collector 52 of the motor transistor 32 to the line 133 between the resistors 132 and 134. When the motor is operating, substantially B+ voltage is supplied through the diode 138 to the line 133 so that the voltage drop across the light 130 is insufficient to turn the light on. However, when the motor is de-energized as a result of the transistor 32 turning off, B+ voltage is supplied across the light 130 and the transistors 132 and 134 to turn the light on. This gives indication that the control circuit 10 has functioned to automatically stop the motor 12.

The track selector switch 76 can also be used to place the drive motor 12 in an automatically stopped condition. For example, in the record mode, momentary closure of the selector switch 76 at any time energizes the solenoid 72 to switch tape tracks and present ground potential to the base 82 of the transistor 84. This switches the transistor 84 "ON" which in turn switches "ON" the transistor 102 to cause the motor transistor 32 to switch "OFF" and stop the motor.

When the manual switch 78 is moved to its open position shown by the dotted lines and indicated by the number 4 in the drawing, the control circuit 10 is set to de-energize the tape drive motor 12 only at the conclusion of the final set of tracks on the tape. Closure of either the head contacts 70 or the track selector switch 76 is ineffective to present a ground potential to the base of the transistor 84, and therefore, the transistors 84 and 102 are prevented from turning "ON." To stop the motor at the end of the final tape track, a switch 142 is mechanically connected in a conventional manner to the track change mechanism in the record/play head 15, and is mechanically controlled thereby to close at the conclusion of the last set of tape tracks. The switch 142 is electrically connected on one side to ground, and on the other side through a resistor 144 to the base of the transistor 84. When the switch 142 closes at the end of the last tape tracks, ground potential is presented to the base of the transistor 84 to switch "ON" the transistors 84 and 102. As described above, this switches "OFF" the motor transistor 32 to stop the motor. Also, while the mechanical switch 142 is not shown connected to provide ground potential to the solenoid, the switch can be so connected to energize the solenoid at the end of the last tape tracks, if desired.

A pause switch 146 is connected in parallel with the mechanical switch 142 to permit selective de-energization of the motor 12 before the end of a set of tape tracks. When the unit is in the record mode, the pause switch 146 can be manually closed at any time to present ground potential to the base of the transistor 84 and thereby automatically stop the drive motor 12 in the same manner as with the mechanical switch 142. Conveniently, the pause switch is not connected to energize the solenoid 72 so that the motor 12 can be restarted as will be hereafter described with the record/play head 15 operatively energing the same set of tape tracks.

A normally open restart switch 140 is provided to restart the motor 12 after it has been automatically stopped by the control circuit 10. The switch 140 is connected between the conductor 36 and the base of the transistor 84. Momentary closure of the switch provides B+ voltage directly to the base of the transistor 84, and this voltage is sufficient to switch the transistor "OFF" and thereby also switch "OFF" the NPN transistor 102. The motor transistor 32 then switches back to its "ON" state and again energizes the motor to convey tape past the unit record/play head.

Conveniently, the capacitor 94 connected between the conductor 36 and the base of the transistor 84 serves to assure that the drive motor 12 is allowed to switch on when a tape cartridge is inserted into the unit. This is particularly important when a conductive strip 17 on the tape is positioned to bridge the head contacts 70 immediately upon insertion into the machine. The capacitor 94 holds the voltage potential at the base of the transistor 84 to the same level as the emitter 90 for a brief time period to prevent the transistor 34 from switching "ON" to allow the motor 12 to energize and drive the strip 17 past the contacts 70.

The capacitor 94 also provides an additional means for restarting the motor 12 after it has been automatically stopped by the control circuit. The motor can be restarted by removing the tape cartridge from the unit to disconnect the voltage supply and then by reinserting the cartridge. Upon reinsertion, the capacitor 94 prevents the transistor 84 from switching on, as described above, for a time period sufficient to allow the motor 12 to turn on and drive the conductive strip 17 past the head contacts 70.

The recording and playing unit is placed in the record fast forward mode by simultaneously moving the previously mentioned switches 68 and 120 from their full line recording and playing (R/P) positions shown in the drawing to their dotted line fast forward (FF) positions. The switch 68 in the fast forward position open circuits the record light 66 to turn that light off, and grounds out the motor speed governor via line 148 to permit the motor 12 to convey the tape 14 past the record/play head at a substantially increased rate of speed. The switch 120 in the fast forward position removes the ground line 118 from the anode of the diode 112 to sufficiently increase the voltage at the anode to forward-bias said diode 112. This increases the voltage at the cathode of the diode 104 to assure that said diode is maintained in a reverse-biased state in the record fast forward mode. The switch 120 also grounds the recording and playing unit preamp voltage supply through a line 16 and diode 18 to turn off the unit recording and playback electronics (not shown). And conveniently, a fast forward light 22 and a resistor 20 are serially connected from the supply lead 24 to ground potential through the switch 120 so that the light 22 turns on whenever the switch 120 is in its fast forward position.

In the record fast forward mode, ground potential is presented to the base of the transistor 84 to switch that transistor "ON" whenever the head contacts 70 or the selector switch 76 are closed. Also, ground potential can be presented to the base 82 by closure of either the mechanical switch 142 or the pause switch 146. Since the diode 104 is still reverse-biased in the record mode, the NPN transistor 102 switches "ON" whenever the transistor 84 is "ON." As before, the motor transistor 32 is switched "OFF" when the NPN transistor is conductive to thereby de-energize the motor 12 and automatically stop conveyance of the tape. The motor can be restarted whenever desired by depressing the restart switch 140.

The recording and playing unit is placed in a play mode by manually moving the record/play switch 58 to its dotted line position shown in the drawing, and by moving the fast forward switches 68 and 120 to their full line recording and playing positions. As shown, in the play mode, the record/play switch 58 connects the cathodes of both of the diodes 104 and 112 to ground through the resistor 108. Also, both sides of the record light 66 are connected to ground to turn said light off.

In the play mode, when one of the conductive strips 17 on the tape 14 closes the head contacts 70, ground potential is provided as described above through the closed manual switch 78 to the base electrode 82 of the transistor 84. The presence of this ground potential at the base of the transistor 84 switches the transistor to its "ON" state, and thereby provides a substantially B+ voltage at its collector 96. This substantially B+ voltage potential is connected through the collector resistor 98 to the base of the NPN transistor 102, and to the anode of the diode 104. However, in the play mode, voltage potential is provided from the conductor 36 through the resistor 114 to ground through the resistor 116 and to the anode of the diode 112. The potential at the anode of the diode 112 is less than the substantially B+ potential at the anode of the diode 104. Therefore, in the play mode, the diode 112 is reverse-biased and the diode 104 is forward-biased. The substantially B+ voltage from the transistor 84 is supplied through the now forward-biased diode 104 and the resistor 108 to ground at the record/play switch 58. Consequently, the diode 104 inhibits the transistor 102 from switching to its "ON" state when the unit is operating in the play mode to prevent de-enerization of the motor by the control circuit. Closure of the head contacts 70 serves only to energize the solenoid to cause the unit record/play head to automatically switch to and play the next successive pair of tape tracks.

In the play mode, the track selector switch 76 can be manually closed, as before, to energize the solenoid to cause the unit head to switch tape tracks. However, similar to the head contacts 70, the selector switch 76 is inoperative in the play mode to switch "ON" both the transistors 84 and 102 to de-energize the motor 12, because of the forward-biasing of the diode 104. Similarly, and for the same reason, the mechanical switch 142 and the pause switch 146 are inoperative to automatically stop the drive motor when the unit is in the play mode.

The recording and playing unit is switched from the play mode to the play fast forward mode by simultaneously moving both of the fast forward switches 68 and 120 to their dotted line positions shown in the drawing. As in the record fast forward mode, the switch 68 grounds out the motor governor via line 148 to allow the motor 12 to operate at a fast forward speed. The switch 120 removes the ground line from the resistor 116 to increase the voltage potential presented at the anode of the diode 112. Because of the chosen resistance values of the resistors 98, 108, and 114 as stated above, this increased voltage potential on the anode of the diode 112 is greater than the substantially B+ voltage presented at the anode of the diode 104. This forward-biased the diode 112 and reverse-biases the diode 104 in the play fast forward mode. Such reverse biasing releases the inhibit on the transistor 102 and causes the substantially B+ voltage from the collector 96 of the transistor 84 to be presented to the base electrode 100 of the transistor 102. This switches the transistor 102 to its "ON" state, and as described above, causes the motor transistor 32 to switch to a non-conducting state to automatically stop the drive motor 12.

In the play fast forward mode, after the drive motor has been automatically stopped by the control circuit, the motor can be restarted in either of two ways. First, the restart switch 140 can be closed to turn the transistors 84 and 102 to their "OFF" states. Alternatively, the fast forward switches can be moved back to their record/play positions shown in the full lines in the drawing to place the unit in the play mode. This once again forward-biases the diode 104 to inhibit the transistor 102 from being automatically stopped by the control circuit.

I claim:

1. An electronic control circuit for controlling the energization of the tape drive motor of a tape recording and playing unit, comprising a voltage source connected to the drive motor for energizing said motor to convey tape past the unit recording and playing head; sensing means for detecting indicating means on the tape upon passage of said indicating means past the unit head; solid state switching means coupled between said sensing means and the motor for electrically disconnecting said voltage source from the motor upon detection of indicating means by said sensing means; and inhibit means having a diode with an anode and a cathode, said anode being connected to said solid state switching means and said cathode being connected to biasing means for selectively biasing said diode, said inhibit means being operative when said diode is forward-biased to prevent said solid state switching means from electrically disconnecting said voltage source from the motor.

2. An electronic control circuit as set forth in claim 1 wherein the indicating means on the tape comprises an electrically conductive strip located at a preselected point on the tape.

3. An electronic control circuit as set forth in claim 2 wherein said sensing means comprises a set of normally open contacts arranged to be bridged by the conductive strip when said strip passes the unit recording and playing head.

4. An electronic control circuit as set forth in claim 1 with the addition of normally closed second switching means coupled between the motor and said voltage source, said solid state switching means being connected between said sensing means and said second switching means and operative to open said second switching means upon detection of the indicating means by said sensing means.

5. An electronic control circuit as set forth in claim 4 wherein said second switching means comprises a normally conductive transistor, said solid state switching means being connected to switch said transistor to a non-conductive state upon detection of the indicating means by said sensing means.

6. An electronic control circuit as set forth in claim 1 wherein said solid state switching means comprises a normally conductive first transistor connected between the motor and said voltage source, and a normally non-conductive second transistor connected between said sensing means and said first transistor, said second transistor being switched to a conductive state upon detection of indicating means by said sensing means and operative when conductive to switch said first transistor to a non-conductive state to electrically disconnect said voltage source from the motor.

7. An electronic control circuit as set forth in claim 1 wherein said solid state switching means comprises a normally conductive first transistor connected between the motor and said voltage source, a normally non-conductive second transistor connected to said sensing means, and a normally non-conductive third transistor connected between said second and first transistors, said second transistor being switched to a conductive state upon detection of indicating means by said sensing means and operative when conductive to switch said third transistor to a conductive state, said third transistor being operative when conductive to switch said first transistor to a non-conductive state to electrically disconnect said voltage source from the motor.

8. An electronic control circuit as set forth in claim 1 with the addition of means connected between said solid state switching means and said sensing means for selectively disconnecting said solid state switching means from said sensing means.

9. An electronic control circuit for controlling the energization of the tape drive motor of a tape recording and playing unit, comprising a voltage source connected to the drive motor for energizing said motor to convey tape past the unit recording and playing head; normally conductive first solid state switching means connected between the motor and said voltage source; a set of normally open contacts arranged to be bridged by one of a plurality of electrically conductive strips located at preselected points on the tape when said strip passes the unit head; normally non-conductive second solid state switching means coupled between said contacts and said first switching means, said second switching means being switched to a conductive state upon bridging of said contacts and operative when conductive to switch said first switching means to a non-conductive state to electrically disconnect said voltage source from the motor; and inhibit means having a diode with an anode and a cathode, said anode being connected to said second solid state switching means, and said cathode being connected to biasing means for selectively biasing said diode, said inhibit means being operative when said diode is forward-biased to prevent said second solid state switching means from electrically disconnecting said voltage source from the motor.

10. An electronic control circuit as set forth in claim 9 wherein said first solid state switching means comprises a normally conductive junction transistor having base, emitter, and collector electrodes, said second solid state switching means being connected to said base electrode and operative to switch said transistor to a non-conductive state upon bridging of said contacts.

11. An electronic control circuit as set forth in claim 9 wherein said second solid state switching means comprises normally non-conductive first and second junction transistors, each having base, emitter, and collector electrodes, said first transistor having its base electrode connected to said contacts and its collector electrode connected to the base electrode of said second transistor, said second transistor having its emitter electrode connected to said first switching means, said first and second transistors being operative to switch to a conductive state when said contacts are bridged and to thereupon switch said first switching means to a non-conductive state to electrically disconnect said voltage source from the motor.

12. An electronic control circuit as set forth in claim 9 wherein said first switching means comprises a normally conductive first junction transistor, and said second switching means comprises normally non-conductive second and third junction transistors, said second transistor being connected to said contacts and operative to switch to a conductive state upon bridging of said contacts, said third transistor being connected to said second transistor and operative to switch to a conductive state when said second transistor is conductive and to thereupon switch said first transistor to a non-conductive state to selectively disconnect said voltage source from the motor.

13. An electronic control circuit as set forth in claim 12 wherein said first and second transistors are PNP junction transistors and said third transistor is an NPN junction transistor, each of said transistors having base, emitter, and collector electrodes, said second transistor having its base electrode coupled to said contacts and its collector electrode coupled to the base electrode of said third transistor, said third transistor having its emitter electrode coupled to the base electrode of said first transistor.

14. An electronic control circuit as set forth in claim 9 wherein the diode of said inhibit means has its anode connected to said second switching means between said second and third transistors.

15. An electronic control circuit as set forth in claim 9 with the addition of manually operable restart means connected to said second switching means for selectively switching said second means to a non-conductive state.

16. An electronic control circuiit as set forth in claim 9 wherein said biasing means comprises a second diode having an anode and a cathode, said cathode being connected to said first diode and said anode being connected to switching means for selectively biasing said second diode.

17. An electronic control circuit for controlling the energization of the drive motor for a tape recording and playing unit, comprising a voltage source connected to the motor for energizing the motor to convey tape past the unit recording and playing head; first switching means operative to close upon detection of indicating means on the tape upon passage of said indicating means past the unit head; solid state switching means coupled between said first switching means and the motor for electrically disconnecting said voltage source from the motor upon detection of said indicating means by said first switching means; and inhibit means having a diode with an anode and a cathode, said anode being connected to said solid state switching means and said cathode being connected to biasing means for selectively biasing said diode for selectively preventing said solid state switching means from electrically disconnecting said voltage source from the motor.

* * * * *